O. A. DANIELSON.
COMBINED AIR SPEED METER AND ANGLE OF INCIDENCE AND SIDE SLIP INDICATOR WITH DIAL THEREFOR.
APPLICATION FILED FEB. 3, 1917.
1,332,810.
Patented Mar. 2, 1920.
5 SHEETS—SHEET 1.
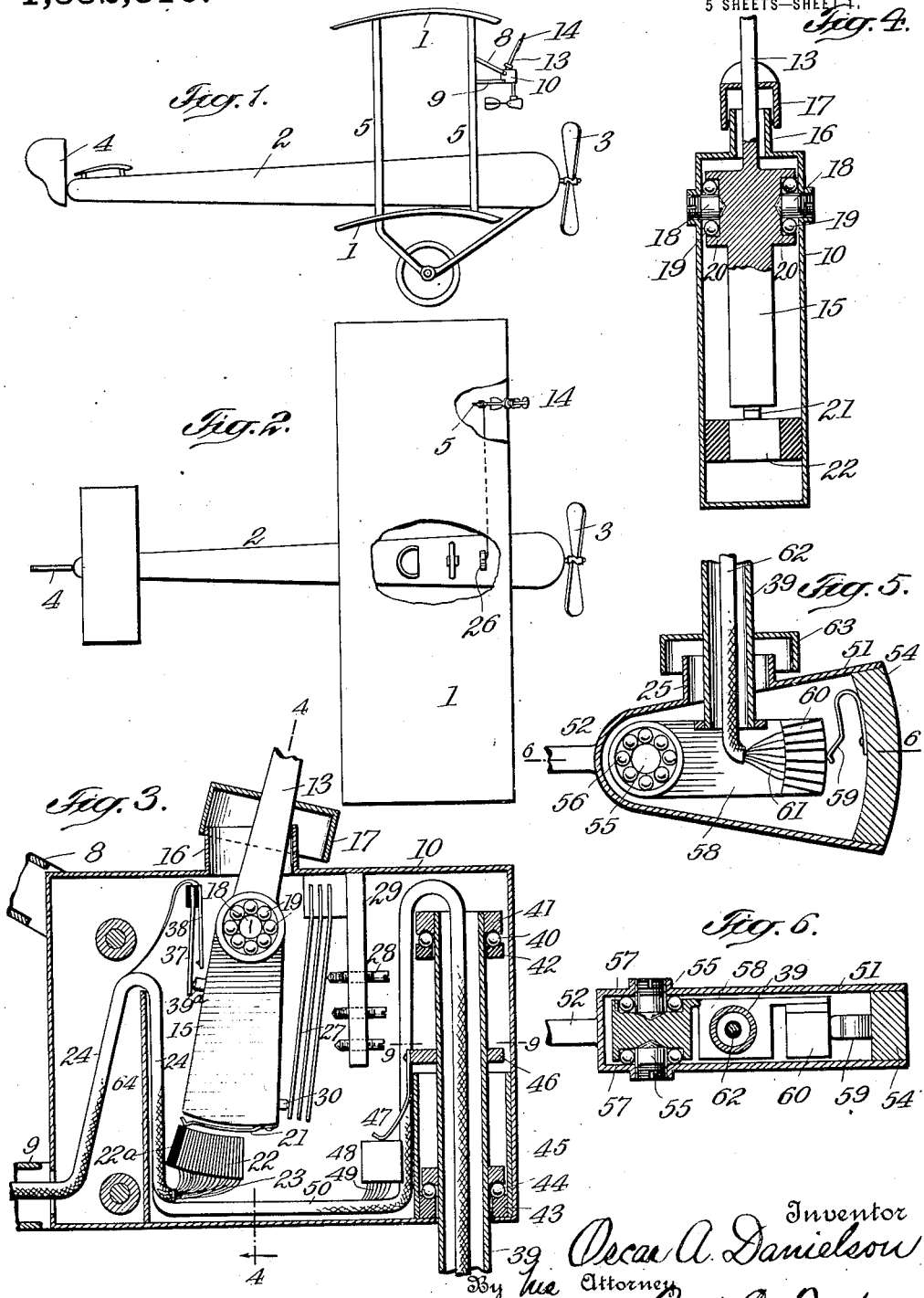

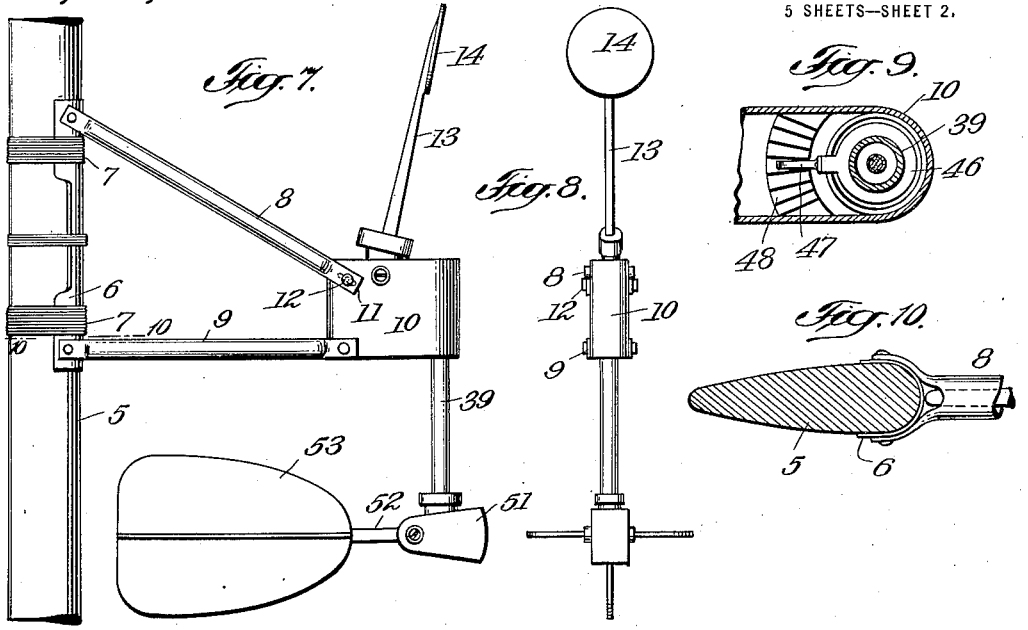
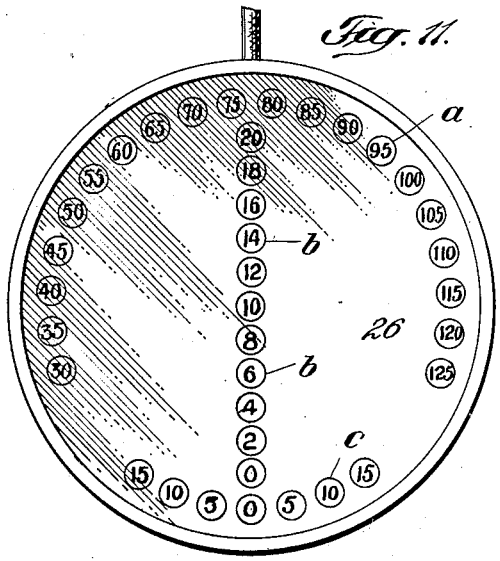
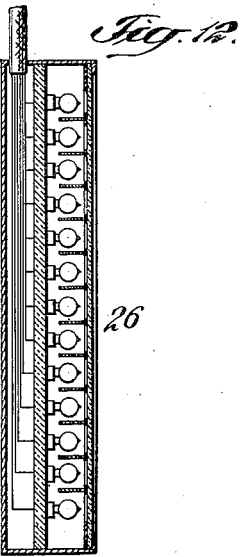

O. A. DANIELSON.
COMBINED AIR SPEED METER AND ANGLE OF INCIDENCE AND SIDE SLIP INDICATOR
WITH DIAL THEREFOR.
APPLICATION FILED FEB. 3, 1917.
1,332,810.
Patented Mar. 2, 1920.
5 SHEETS—SHEET 3.
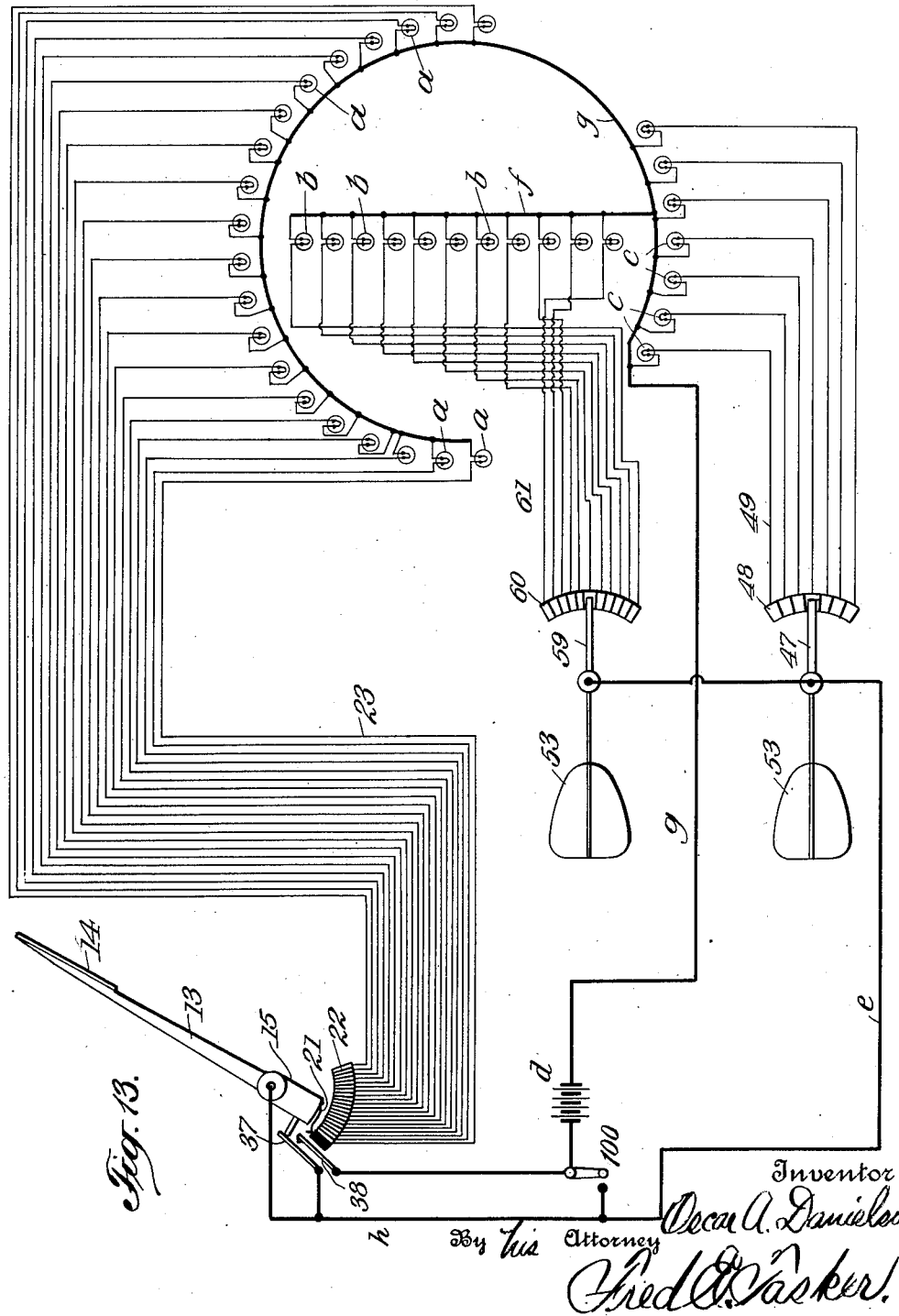

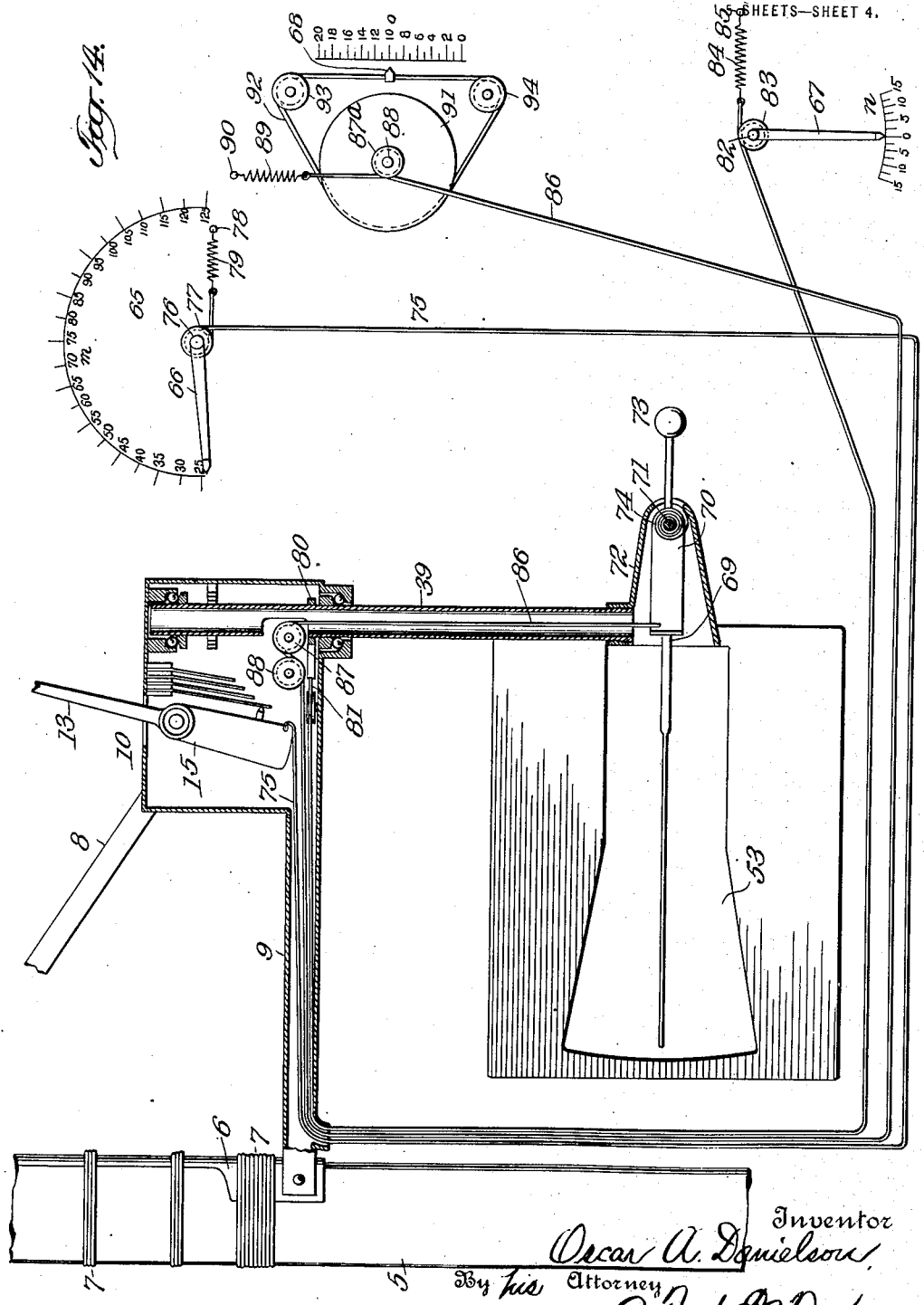

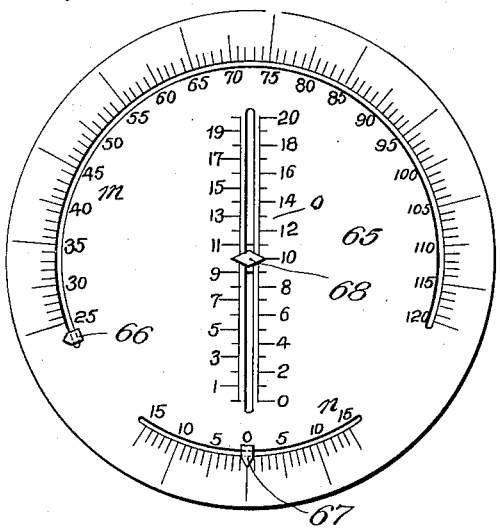
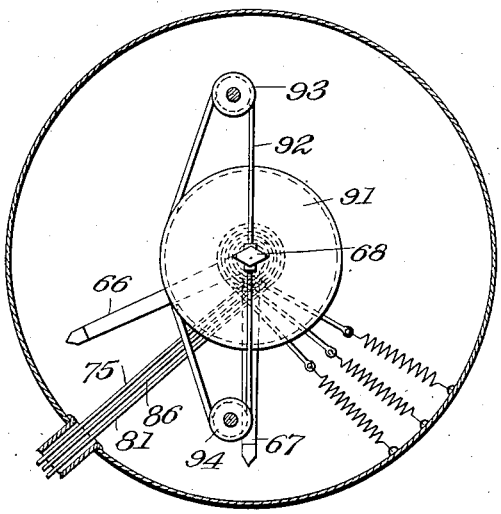
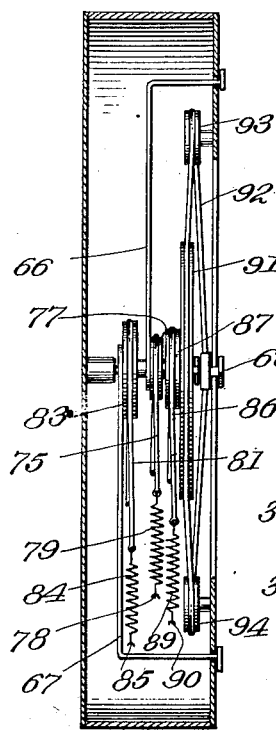
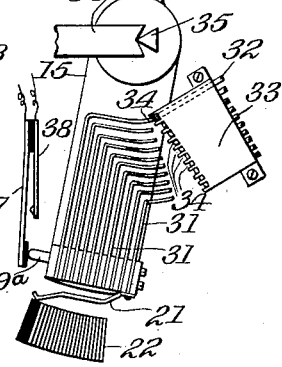
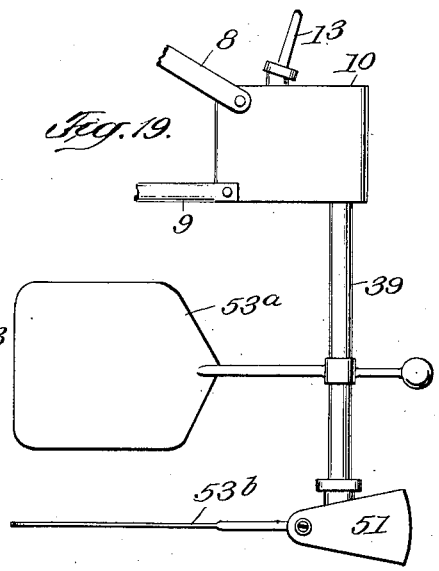

UNITED STATES PATENT OFFICE.

OSCAR A. DANIELSON, OF NEW YORK, N. Y.

COMBINED AIR-SPEED METER AND ANGLE OF INCIDENCE AND SIDE SLIP INDICATOR, WITH DIAL THEREFOR.

1,332,810.  Specification of Letters Patent.  Patented Mar. 2, 1920.

Application filed February 3, 1917. Serial No. 146,320.

*To all whom it may concern:*

Be it known that I, OSCAR A. DANIELSON, a citizen of the United States, and resident of New York, in the county of New York and State of New York, have invented certain new and useful Improvements in Combined Air-Speed Meters and Angle of Incidence and Side Slip Indicators, with Dials Therefor, of which the following is a specification, reference being had therein to the accompanying drawing.

This invention relates to aeroplanes and other aircraft, and more particularly to instruments for indicating various attitudes of an aeroplane with relation to the currents through which it passes in its flight.

The first of these attitudes is that of speed. Instruments designed to indicate speed of an aeroplane or other flying machine through the air in miles per hour or other period of time are called air speed meters or gages.

The second attitude referred to is the angle of incidence, or angle of attack as it is often called, which is the angle made by the chord of the cambered surfaces of an aeroplane to the stream of air through which it is passing. The angle of incidence is that factor in the flight, which, coupled with the speed of the forward movement of the planes, gives to them their lifting or sustaining force. Speed through the air and the angle of incidence or attack are closely related and may be said to be interdependent attitudes of an aeroplane in flight.

A third attitude to which I desire to call attention at this time, is that which relates to the angle of side-slip or the skidding of an aeroplane on making a turn. The action is similar to the lateral acceleration of an automobile when slipping to one side at a turn in a race course. To avoid such slipping action the track for automobile racing is built high on the outside of the course and slopes downwardly to the inside thereof whereby dangerous skidding or side-slipping when making a turn is avoided. Similarly in the flight of an aeroplane around a curve it is customary to bank or manipulate the controls for the purpose of raising the wing traveling on the outside of the curve so that, therefore, when an aeroplane is properly banked on a turn, there will be no side-slipping either toward the outside of the curve or toward the inside. Outside slipping on a turn results in loss of speed, and is an indication of improper and inefficient control. Inside slipping may result in loss of control and is very dangerous.

Instruments for indicating the last two mentioned attitudes, namely, the angle of incidence and the angle of side-slip, form the subject-matter of my co-pending application for Letters Patent filed September 30, 1916, Serial No. 123,093, and are referred to in this application chiefly in their relation to a novel and useful way of combining or associating their indicating dials with the indicating dial of the air speed meter which forms the primary subject-matter of the present application.

In respect to air speed meters, a distinction should be drawn between air speed or speed of an object through the air at a distance above the ground, and ground speed or speed of an object with relation to the surface of the ground, *i. e.* the rate of progress over the country. If an aeroplane were flying in perfectly still air, its air speed in miles per hour would also be its ground speed or rate of progress with relation to objects on the earth in miles per hour; but there is almost always more or less wind blowing and the interference of divers currents of air, and, hence, the ground speed may be greater than the air speed or less, accordingly as the wind may be blowing in the same direction as the aeroplane is flying, or in the opposite direction or otherwise, or an interference with the progress of the aircraft may be due to currents of air or pockets or areas of greater or less density or other abnormal disturbing characteristics in the atmospheric strata.

Air speed coupled with the angle of incidence gives to the plane surfaces their supporting force. For every angle of incidence within proper limits there is a certain critical air speed which will give to the planes a lifting force sufficient to support the weight of the aeroplane in horizontal flight; while a higher speed will cause the aeroplane to ascend and a lower speed will cause it to descend. For every aeroplane there are two critical air speeds, namely, a minimum speed below which the planes do not have lifting force enough to support the weight of the machine, which speed is commonly called "stalling speed," and a maximum speed above which the machine is subjected to strains and stresses which its frame work and structural constitution may not be strong enough to safely bear. The usefulness of an indicating instrument to indicate the two critical speeds as well as the less vital intermediate speeds which concern the sufficient and proper control of an aeroplane is obvious without further analysis of the operation.

The object of my present invention is to provide an air speed meter of the type which is actuated by variations of air pressure exerted ordinarily upon a plane surface normally to the wind, which variations are due to variations in the velocity of the air current through which the aeroplane is flying. An air speed meter dependent upon pressure for its operation is deemed to be a better indicator of the aerodynamic forces acting upon an aeroplane than a true air speed meter of the anemometer type, because it is affected by variations in density at different altitudes in the same degree as the lifting force and head resistance to the flight of the aeroplane is affected. One advantage of the pressure type of speed meter is that it may be easily checked with reference to the accuracy of its readings by means of a spring balance or other testing device immediately before making a flight. A further advantage of my air speed meter is that it is adapted for use in connection with an electric lamp-indicating dial which has a high degree of visibility both for day and night flying, and that this dial may have associated with it the indicating dials of my improved angle of incidence and angle of side-slip meters. These three functions in the instrument, therefore, air speed, angle of incidence, and side-slip, show intimately interrelated attitudes of an aeroplane in its flight, and the association of the three indicators on one dial face has peculiar advantages in visibility and ease of reading as well as in weight and in economy of space occupied by the instrument. Great skill is necessary in controlling aeroplanes as they are at present built, and such skill is only attained after much practice, and then only by persons endowed with a keen sense of balance or proper equilibrium and who develop by practice great accuracy in judging of the speed and direction of the wind by its pressure upon their faces. They know by the diminished pressure of the wind when they are approaching a stalling speed; they know by the "feel" of the wind upon their faces the direction and extent of side-slipping or skidding. Efficient instruments will indicate these attitudes of an aeroplane in its flight far more accurately than they can possibly be judged by the most skilled aviator and are very valuable and helpful to a beginner who is learning to fly, and they also extend the possibilities of learning the secret of successful flying to many who may not be capable of mastering the difficulties of the art without such mechanical aids.

One of the features comprised in my present invention consists of a device for economizing in the use of electrical current and comprises a device for automatically turning on the current when the aeroplane starts on its flight and turning off the current upon landing, whereby the aviator is relieved of the necessity of operating a switch manually, the details of such automatic device being susceptible of wide variation in use so that the device may be brought into action by the pressure of the wind against a disk or equivalent device exposed thereto when the aeroplane is in flight.

The invention may also be said to comprise various details and peculiarities in the construction, arrangement, and combination of the various parts, substantially as will be hereinafter described and then more particularly pointed out in the ensuing claims.

In the accompanying drawing illustrating my invention:

Figure 1 is a side elevation of an areoplane provided with my improved combination of meters;

Fig. 2 is a top plan view of the same;

Fig. 3 is an enlarged vertical section of the casing or chamber containing the commutators, brushes, and other appurtenant parts, which are operated by the wind pressure arm belonging to the speed meter and some of the similar parts belonging to the vane which operates the angle of incidence and angle of side-slip mechanism;

Fig. 4 is a detail vertical section on the line 4, 4 of Fig. 3;

Fig. 5 is an enlarged detail section of the mechanism belonging at the lower end of the devices shown in Fig. 3, the tube shown in this figure being the lower end of that shown in Fig. 3 from which it is broken off for convenience of illustration;

Fig. 6 is a horizontal sectional plan on the line 6, 6 of Fig. 5;

Fig. 7 is an enlarged detail side view of the wind-pressure-operated arm belonging to the air speed meter and the vane belonging to the angle of incidence and side-slip indicator with their supports;

Fig. 8 is a front view of the same;

Fig. 9 is a detail sectional plan on the line 9, 9 of Fig. 3;

Fig. 10 is a cross-section of the mast on the line 10, 10 of Fig. 7, and shows the way in which the adjoining parts are connected thereto;

Fig. 11 is a detail plan view of the dial or signal face carrying intersecting rows of incandescent lamps or other signals;

Fig. 12 is a transverse sectional view of the same;

Fig. 13 is a diagrammatic view showing the various electrical circuits belonging to the visual indicators that denote air speed, the angle of side slip, and the angle of incidence, all arranged in connection with a single dial face on the instrument board;

Fig. 14 is a vertical sectional view of a modified form of the invention in which I have represented mechanical connections between the wind pressure device, the vane or vanes, and the indicators, as also a modified form of indicating means, the latter being represented more or less in a conventional manner;

Fig. 15 is a plan view of a modified form of dial or signal face having graduations or markings thereon and having pointers arranged in connection therewith.

Fig. 16 is a vertical section of the casing of said dial so as to illustrate the interior mechanism;

Fig. 17 is a transverse section of said casing;

Fig. 18 is a detail view of a modified arrangement of parts for fulcruming the wind pressure lever and also shows a different form of springs and adjusting means therefor for regulating the tension of said lever;

Fig. 19 is a modified detail side view of the casing containing the wind pressure operated arm belonging to the air speed meter and the vane which controls the angle of incidence and the side-slip indicators, said vane being made in two parts instead of one.

Similar characters of reference designate corresponding parts throughout the different figures of the drawing.

In Figs. 1 and 2 I have delineated in outline or conventional form an example of aeroplane or aircraft, for explanatory purposes merely, the same being a biplane and having upper and lower planes 1, 1 carried by the main longitudinal frame or fuselage 2, at one end of which frame is a propeller 3 and at the other end a rudder 4, while between the aforesaid planes 1, 1 are the uprights 5, 5 to one of which is attached a pressure-operated unit having a member that actuates the mechanism of the air speed meter and also a member or members actuating the mechanism of the angle of incidence and the angle of side-slip indicators.

The relation of these combined members for performing within a single unitary combination the three functions alluded to is represented so far as its outer appearance is concerned and its mode of support in Figs. 7 and 8, where it will be seen that one of the uprights 5 between the two planes 1, 1 of a biplane is provided with a light sheet metal plate 6 curved to fit the upright and secured thereto by a wrapping of cord, wire, or adhesive tape 7 at one or several points (see Fig. 7). To the plate 6 are attached a pair of steel bracing tubes 8 and 9 which carry at their outer ends a casing 10. The connection of the tube 8 to the upper part of casing 10 is made by a pin 12 passing through an elongated opening at 11 whereby the support of the casing 10 is made adjustable and it is possible to relate the casing 10 to the arms 8 and 9 and mast 5 so that it will occupy the desired position in reference thereto.

Above the casing 10 and extending into the top thereof is an upwardly-projecting arm 13 provided with a plate or disk 14 which receives against it the impact of the air or wind pressure as the aeroplane moves forward through the air. The flat disk or plate 14 may be of any shape and greater or less size. The lower end of the arm is pivotally supported within the casing 10, and below the pivotal point thereof it is formed with a lower section 15, preferably made heavier or weighted so that it will balance the weight of the arm 13 and thereby neutralize the effect of gravity thereon. The top of the casing 10 is provided with an opening having a collar 16 surrounding it, which is loosely covered by a cap 17 attached to the arm 13. During the movements of the arm 13 the cap 17 is adjusted with relation to the collar 16, but the latter is kept covered and substantially closed at all times so that the interior of the casing 10 may not be unduly affected by storms or other conditions from without. The pivoting of the lever 13 within the casing 10 may be made in a great variety of different ways, as for example, by the ball bearing or bearings shown in Figs. 3 and 4, or by the knife edge support indicated in Fig. 18. When ball bearings are used, I can if desired insert a pair of pivot screws 18 in the wall of the casing 10 and arrange in connection with each one of these screws 18 a vertical series of balls 19 which are held between the screws and the walls of recesses 20 in the sides of the arm or lever 13, or its weighted extension 15, all as clearly indicated in Fig. 4, as well as in Fig. 3; but it will be clearly perceived that there may be a wide variation in the ball bearing means employed for the purpose stated, and what I have shown here is given merely by way of example and without any thought of being confined thereto. The lower portion 15 of this transmitting lever is provided with a brush 21 (see Fig. 3) which acts upon a series of properly insulated segments or electrical contact pieces 22 supported within the casing 10, from which contact pieces 22 lead wires 23 which are preferably bound together in a cable 24 that leads away from the casing through the protecting tube 9 or otherwise, as may be preferred, said wires running to an indicating dial 26 (see Figs. 11 and 12) which is placed at any suitable point in the body of the aeroplane where it may be conveniently seen by the aviator, as for example, near the front end of the main portion or fuselage 2. The various electrical circuits between the segments 22 and the indicating devices on the dial 26 which are preferably illuminated by electric lamps, are shown in Fig. 13 in outline view, and will be hereinafter described in greater detail. It will be noted that at one end of the series of segments 22 there is an insulated block 22ᵃ on which the brush 21 rests when the pressure-operated arm 13 is inactive and when the battery is cut out and the circuit broken.

It should be noted that the contact pieces 22 are spaced equidistant from each other, and that they represent equal divisions in the scale of speeds in miles per hour. It is a well established law in aerodynamics that the pressure on a given surface increases as the square of the velocity (at least within the range of speeds here used) so that, therefore, in order that the brush 21 may be moved along the row of segments 22 at a uniform rate or distance, each step will be acted upon by force against the plate 14 which increases as the square of the speeds it is desired to indicate. I provide a series of springs 27 in connection with which are adjusting screws 28 carried in a bracket 29 on the inside of the casing 10. These adjusting screws 28 regulate the tension of the springs 27 and cause them to exert the proper pressure against the projecting pin 30 on the lower portion 15 of the transmitting lever. There may obviously be any number of the springs 27. The increase or decrease of the pressure that is thus placed by the springs 27 against the movement of the lower portion 15 of the said lever 13 opposes the movement of the plate 14 on the arm 13 at a rate which increases as the square of the distance through which said plate 14 moves. Obviously these springs 27 may be brought into action at various points in the travel of the brush 21 to correct any irregularity which might arise in the maintenance of the proper balance between the pressure on the plate 14 and the tension of the springs.

In lieu of springs, such as I have indicated at 27, having contiguous thereto the adjusting screws 28, I may employ angular springs 31, as shown in Fig. 18, in connection with which are the adjusting screws 32 operating in a support 33 which has notches 34 cut therein to receive the bent ends of said springs 31, and thus guide them so they will be in contact with a greater or less number of the adjusting screws 32, all in like manner as I have explained with reference to the springs 27 and screws 28. I may say also that in Fig. 18 instead of a ball bearing support for the lever 13 I have therein shown an example of knife-edge support consisting of the sharp projection 35 on the lever engaging a V-shaped notch in the end of an arm 36 held rigidly on the inside of the casing 10.

Referring again to Figs. 3 and 18, 37 denotes an insulated spring held away from another insulated spring 38 by a stud 39ᵃ on the lower part 15 of the transmitting lever, both springs 37 and 38 being supported from the inside wall of the casing 10. Spring 37 in its normal or idle position, therefore, is kept away from spring 38, and acts as a switch for opening the battery circuit when the aeroplane is on the ground and out of service, but when the aeroplane is in action and begins to move forward so that the wind pressure vibrates the transmitting lever more or less, the result will be to remove the pin 39ᵃ from the spring 37 so that the latter will contact with the spring 38 and automatically close the circuit. This happens always when the aeroplane enters upon a flight and during its continuance. The wires leading to the springs 37 and 38 preferably join the cable 24, as shown in Fig. 3, and run therewith for a greater or less distance. Instead of this automatic switch, a manually-operated switch as shown at 100 in Fig. 13 may be used if desired.

Suspended from the casing 10 in any suitable manner, preferably by means of ball bearings, is a tube 39, the upper portion thereof being shown in Fig. 3 and the lower portion in Fig. 5. At 40 I indicate a horizontal series of balls that lie between a collar 41 secured to the upper end of the tube 39 and a similar collar 42 supported on the inside of the casing 10, and in the bottom of the casing 10 there is a suitable raceway 43 carrying another horizontal series of balls 44 between said raceway 43 and another raceway 45 secured to the tube 39. In this way two ball bearings are used for supporting the tube 39 in the casing and allowing said tube to revolve laterally. This tube is further provided with a collar 46 having a brush 47 which engages a series of segments or contact pieces 48, from which run electrical conductors or wires 49 that are preferably congregated into the cable 50, as shown in Fig. 3, said cable running through the casing and combining with cable 24, and then outwardly through tube 9. Cable 50 also leads over and unites with the cable 62 for convenience of arrangement. At the lower end of the tube 39 is a casing 51 from which projects rearwardly a horizontal arm 52 carrying a vane 53, the other end of the casing 51 being enlarged at 54 to increase its weight or being counterweighted to counterbalance the weight of the vane. The vane 53 has an up and down oscillating motion around a pivotal point, which may be a ball bearing or a plurality of ball bearings. To arrange these I place a pair of screw pivots 55 in the side walls of the casing 51, as shown in Figs. 5 and 6, there being vertical series of balls 56 around these screw pivots 55 and between them and the walls of recesses 57 in the arm 58 which is carried by the lower end of the tube 39. Thus, as the vane 53 moves up and down and carries the rod 52 and the casing 51 up and down in the variations of the angle of incidence of the machine, the pivoting of the casing 51 to some connected part of the lower end of the tube 39 will be performed in the manner I have just described, and this movement will impart motion to a brush 59 carried by the large end 54 of the casing 51, which brush 59 works over the segments 60, from which lead wires 61 into a cable 62 running up through the tube 39 and 39ª and being connected with the above mentioned cable 50. By means of these parts, therefore, the angle of incidence is shown on the indicating dial, the electrical circuits being illustrated in Fig. 13, and being hereinafter more fully explained. Thus it will be observed that the up and down movement of the vane 53 causes a registration on the dial of the angle of incidence, while a lateral movement of the same vane 53 through its connection with the tube 39 and a lateral bodily rotation of said tube causes through the wiping of the brush 47 over the segments 48 a registration of the angle of side-slip or skid on the dial. The part of the vane 53 which imparts motion to the tube 39 for registering side-slip through the brush 47 may be attached directly to the tube 39 as a vane 53ª (see Fig. 19); and also another part of the vane 53, which by its up and down movement indicates the angle of incidence may be attached to the tube 39 as the vane 53ᵇ (also shown in Fig. 19).

The wiring for the electric circuits for the three instruments will easily be seen and understood by reference to Fig. 13. The wires 61 having to do with the angle of incidence pass up through the tube 39 as cable 62 and are light and flexible so as to permit easy oscillation of the cable through an angle of 25 or 30 degrees. It will also be noted, that the cable 24 passes through the lower brace arm 9 on its way from the casing 10 to the upright 5. Casing 51 is tight except at the upper portion thereof where the tube 39 enters the same, at which point it is provided with a cylindrical projection 25 that is covered by cap 63 securely fastened on the tube 39 so that foreign substances cannot easily clog the interior of the casing 51, and this casing is preferably filled with a light oil to reduce the friction and keep the operative commutator segments 60 free and clean; also it will be noted that the casing 10 has therein a partition 64 over which the wires 23, or the cable 24 made of said wires, pass for the purpose of allowing an oil-tight compartment in said casing 10 for the commutator segments 22 and 48 and brushes 21 and 47.

One form of dial or indicator face is shown in Figs. 11 and 12, being designated 26, and being located, as seen in Fig. 2, in front of the aviator where he can readily inspect the same. This dial consists essentially of a casing containing incandescent lamps which illuminate numerals marked upon a transparent face. I find it convenient to arrange the numerals in the manner shown in Fig. 11 where $a$ designates a series of numbers indicating air speed in miles per hour, said numbers being arranged along an arc of the periphery of the upper part of the dial, which arc is of greater or less length according to the number of lamps and numbers used in the series. The notation of this series can obviously be changed and modified within wide limits, but I find it convenient to run the numbers at intervals of five, beginning with 30 and ending with 125. On the vertical diameter of the dial 26 is another row of numbers $b$, which row intersects the air speed indicators $a$, said numerals or indicators $b$ being for the purpose of showing the angle of incidence or attack and being calibrated in any desired manner, as for instance a series commencing with zero and increasing by two each time in an ascending scale up to 20. Further on an arc of the periphery of the dial near the bottom thereof is a comparatively short series of numerals $c$, which series is intersected by the row of numerals $b$ at the lower end of said row, which numbers $c$ are used for the purpose of indicating side-slip or skid, and preferably consist of numbers increasing from 0 by intervals of 5 up to 15 or thereabout. Thus it will be perceived that I provide a novel and effective dial with indicators thereon for the three functional requirements of air speed, angle of attack, and angle of side-slip, with the numbers and the corresponding lamps arranged along the periphery and through the diameter of the dial, so that they are readily contradistinguished from each other by their position, and are instantly visible to the operator, so that the illumination of any single lamp of either scale is perceived by him the moment it takes place, so that he is fully advised regarding the position of his plane as well as its speed at all times, and is able to keep it thoroughly within control.

The electrical circuits whereby the indicating lamps belonging to the dial are illuminated for the different scales are clearly portrayed in outline fashion in the conventional drawing in Fig. 13, to which I will now briefly refer. Suppose that a flight is about to be made. The aeroplane must first be propelled along upon the ground or upon the water, as the case may be, until it attains a speed which will give to the planes a lifting force sufficient to overcome the weight or force of gravity upon the machine. It may be taken that this speed is 40 miles per hour. As the aeroplane runs along and attains a speed of say 25 miles per hour, or even before it attains that speed, the action of the pressure of the wind against the exposed disk 14 will vibrate the lever 13 and release the restrained spring 37, allowing it to contact with the spring 38 and close the circuit through the battery so that the electrical mechanism will be energized and in condition for operation, the battery being shown at d. If we assume that the control devices are set so as to give the planes an angle of incidence of 8 degrees, the brush 59 will be held by the vane 53 so that it will be in contact with a segment 60 from which leads a conductor 61, through cables 62, to that one of the lamps b which is placed so as to illuminate the numeral 8 on the dial, it being seen that this indicator marked 8 will be lighted over a circuit running from the battery d, wires h and e, brush 59, one of the segments 60, one of the wires 61, which illuminates numeral 8, and conductor g, so that the circuit is made complete through both poles of the battery. If now we may assume that the aeroplane is headed directly into the wind, which is always a desirable condition in getting off, the vane 53 will set the brush 47 belonging to the angle of side-slip indicating mechanism on the middle or zero segment of the series of segments 48, which segment communicates with one of the wires 49 leading in the form of the cable 50 to the series of side-slip indicators c, and in the present instance with the particular lamp c which illuminates the zero of this scale, which will indicate that the aeroplane is headed directly into the wind. The electrical circuit will be readily understood by referring to Fig. 13 and will include particular lamp c, the particular wire 49 running thereto from the corresponding segment 48 with which the brush 47 is now in contact, the conductor e connecting with said brush 47 and leading therefrom to one pole of the battery and the conductor g leading from the lamp to the other pole of the battery d. With any other one of the lamps of the series c, a similar electric current is established under proper conditions. Further viewing the flight of the aeroplane, it will be perceived that when it attains a speed of 30 miles per hour, the pressure upon the exposed disk 14 will have attained a force sufficient to overcome the tension of the first spring 27, for example, and the result will be to move the brush 21 to the first one of the segments 22 of the adjoining series of commutator segments, which will have the effect of closing an electric circuit running to one of the lamps a on the indicator dial, that is to say, that lamp which illuminates the figure 30 and thereby indicates that there is an air speed of 30 miles per hour, the said electric circuit being easily outlined in Fig. 13 and including the particular lamp a, one of the conducting wires 23 leading thereto from the particular commutator segment 22 with which the brush 21 is at the time in contact, and the circuit also including the conductor g which runs from the particular lamp a to one pole of the battery d and the conductor h which runs from the other pole of the battery d to the lower portion 15 of the transmitting lever 13 and its attached brush 21. This is clearly shown at the left hand portion of Fig. 13, where the conductor h runs around to the lever 13 and it will obviously be connected with the battery d when the switches are properly placed. A similar explanation, of course, may be made with reference to the electric circuit over which the current flows when the circuit is closed for the purpose of illuminating any other one of the lamps a in correspondence with the speed at which the aeroplane is running at any particular time. As the speed increases the brush 21 will be moved farther and farther along until it comes in contact with the segment whose connected wire leads to the lamp which illuminates the numeral 35, while still said brush remains in contact with the segment controlling the wire running to the lamp 30, the brush 21 being preferably made large enough to make joint contact with two adjacent segments 22 for a limited period, so that both numerals 30 and 35 are simultaneously illuminated, and a speed will consequently be indicated between these two members, that is to say, one of 32½ miles per hour. The result is attained as suggested by making the width of contact of the brush or brushes 21 equal to one-half the width of one of the segments 22. The accelerations of the aeroplane while traveling upon the ground are thus registered and when a speed of 40 miles per hour is attained, the planes receive lifting force sufficient to overcome the effect of gravity, and slowly the machine rises and increases in speed and lifting power. A common speed for aeroplanes at the present time is 75 or 80 miles per hour. While the aviator is climbing to a suitable altitude before setting off on a horizontal flight he may maintain an angle of incidence of from 10 to 12 degrees and it may be assumed that because of this high angle of incidence which results in a relatively high head resistance, his air speed is kept down to 50 or 60 miles per hour; but when sufficient altitude has been attained, if we assume that the angle of incidence is set at 4 or 5 degrees for horizontal flight, this may result in the air speed increasing to 75 or 80 miles per hour. If it be desired to descend to a lower level and that without throttling the motor, the angle of incidence may be reduced still further, and in a steep dive the air speed may mount up to 115 or 125 miles per hour. While these changes in the air speed and angle of incidence are being indicated on the dial any side-slipping or skidding in the making of turns will also be clearly shown on the arcual scale in the lower part of the dial. An important part of my invention and one which I desire to emphasize is that the association or combination of the indicating lamps of the three scales of notation, far from leading to confusion because of their propinquity to each other, is believed to possess peculiar and decided advantages by reason of the fact that these groups of lighted lamps serve as points of comparison, one with the other, to show at a glance through their comparative position their relative values. A lighted lamp in the vertical row indicating the angle of incidence, serves as a center line by which air speed may be instantly recognized to be above or below, about 75 miles say, per hour. If a lamp is lighted at the upper left hand portion of the air speed scale, it shows instantly by virtue of its position alone that the speed is below about 75 miles per hour, whereas if a lamp is lighted in the upper right hand portion of the air speed scale, its position instantly signifies that the speed is above 75 miles per hour; likewise side-slip will be recognized instantly to be to the right or to the left, accordingly as the signal is flashed to the right or to the left of the center line marked by the vertical angle of incidence scale; likewise, a lamp lighted at the bottom of the dial for indicating the side-slip or its absence, and one lighted near the top of the dial in the air speed scale, will serve as points from which the angle of incidence may be quickly judged by virtue of the proximity of the lighted lamp to the central point between the upper and lower scales. To further aid in distinguishing the three meters I may employ different colors for each group of lamps or scale notations. Thus by the use of a vertical diametrical scale on the dial which intersects partial peripheral scales at the top and bottom, I furnish an original and approved design of dial which has the many beneficial advantages which I have just pointed out and makes it as easy to judge quickly of air speed, the angle of incidence and the angle of side-slip as an ordinary observer is able familiarly to judge the time of day or the time on a clock or watch by simply noting the position of the hands, and without using any figures or characters. Obviously it is possible for me, therefore, to broaden the idea of the dial by substituting any kind of characters or reference figures and by arranging the three groups either on curved lines at top and bottom with an intersecting straight diametrical line, or by substituting other curved or rectilineal scales in place thereof, provided only the same object is attained in substantially the same way.

Referring now to Figs. 14 to 17, I have shown there a modified form of dial equipped with several pointers that are actuated by mechanical instead of electrical connections with the wind pressure operated transmitting lever and the vane device, the result, therefore, being practically the same through these different connections. The modified form of dial which is indicated by the reference numeral 65 is substantially the same as that shown in Fig. 11 except that it has a graduated peripheral scale $m$ at the top, wherewith a pointer 66 operates, the same being for indicating air speed; a shorter peripheral scale $n$ at the bottom wherewith a pointer 67 operates to show the angle of side-slip, and a diametrical vertical graduated scale $o$ wherewith a pointer 68 operates for the purpose of indicating the angles of incidence. Thus the relative location of the groups of indicating marks for showing air speed, those for showing the angle of incidence, and those for indicating the angle of side-slip, are arranged in a manner equivalent to what is shown in Fig. 11, and consist of scale or graduation marks instead of illuminated signals. The vertical scale $o$ differs further from the row of lamps $b$ in having a finer graduation so that single degrees are marked instead of alternate degrees; but all these changes are obviously easily within the scope of my invention and of the dial inasmuch as I am privileged to vary the precise arrangement of the indicator within wide limits. It will be understood that the illuminated signal may at times be used in preference to the graduated dial, and often the reverse may be the case, and further, that either one or the other may be operated by connection with a pressure plate of the kind which I have just described, or with a Pitot or Venturi tube or any other air pressure device which may be in practical use on an aeroplane and which it may be found possible to couple up to my improved dial, and I desire to claim broadly the use of a dial and groups of signals relatively arranged, as I have stated, whatever may be the means for operating said signals.

Proceeding now to explain in detail the mechanical connections whereby the pressure plate 14 and its transmitting lever 13 and also the vane 53 may actuate the pointers 66, 67, and 68 it will be noted that the arm 13 is hung pivotally within a casing 10, as shown in Fig. 14 in like manner as it is in Fig. 7, and that the tube 39 is hung in a depending manner from the casing 10 so that it may revolve on a ball bearing to indicate the angle of side-slip as the tail 53 is moved back and forth in a horizontal plane, and also that the rod 69 belonging to the vane 53 is in this case connected to a block 70 which is pivoted at 71 in the casing 72 that is attached to the lower end of the tube 39, said block 70 being provided with a counterweight 73 on an arm projecting through the end of the casing 72, the whole being arranged so that as the vane 53 moves up and down in a vertical plane it may determine the angle of incidence through mechanical connections with the pointer 68. The pivotal mechanism 71 for the block 70 is preferably provided with a coiled spring 70 to balance the springs at the other end of the mechanical connection. Attached to the lower section 15 of the transmitting lever 13 is a wire 75 that leads through a suitable course with proper guides or otherwise as desired, the same only being shown in a conventional manner in Fig. 14 for purposes of convenience of illustration, to the stud or pivot 76 of the pointer 66 which indicates the air speed of the aeroplane, said wire 75 running around a pulley 77 on said pin 76 and being attached at 78 to some fixed part of the dial or frame, a spring 79 being interposed between the fixed point 78 and the adjoining end of the wire 75 so as to give the proper tension to the wire. It will thus be seen that as the transmitting lever is vibrated back and forth according to the variations of the action of the wind, the pointer 66 will be caused to travel around over the graduations m of the dial 65 and indicate the rate of speed at any particular time. Secondly it will be noticed that the rotary tube 39 is provided with an arm or pulley 80 to which is attached a wire 81 that leads out of the casing 10 and passes through suitable guides until it reaches the pivot or stud 82, to which the angle of side-slip pointer 67 is attached, said wire 81 passing around a pulley 83 on said pin 82 and being provided with a tensioning spring 84 by means of which the end of the wire is yieldingly connected to a fixed point 85 in the dial casing or on the frame or otherwise. Also, thirdly, it will be seen that the block 70 which is rigidly connected to the rod 69 of the vane 53 has attached thereto a wire 86 which runs upwardly through the tube 39 and then around suitable pulleys 87 and 88 journaled within the casing 10 and then passes alongside of the wires 75 and 81 being properly guided and directed until it reaches a pulley 87$^a$ mounted on a short shaft 88 in some suitable frame, as for example, the casing for the dial, said wire 86 passing around said pulley 87$^a$ and being connected by means of spring 89 with some fixed point 90, said spring 89 serving to tension the wire 86 and keep it tight and in place. The shaft 88 carries not only the small pulley 87$^a$ but a larger pulley 91, around which passes a wire or cable 92, which likewise passes around two grooved pulleys, an upper at 93 and a lower at 94, journaled one above the other in the casing of the dial or some other suitable part of the frame, so that thus an endless cable 92 passes around the large pulley 91 and the small pulleys 93 and 94 and the part of the cable between the pulleys 93 and 94 carries the pointer 68 which operates alongside of the graduated scale o for indicating the angle of incidence. I have thus provided, therefore, by means of suitable connecting wires (though other instrumentalities may be substituted therefor) for causing the transmitting lever to transmit motion to the pointer 66 which exhibits the air speed and the vane to transmit motion similarly to the pointer 67 which indicates the angle of side-slip on the graduated scale n and also the said vane to similarly transmit motion to the pointer 68 which indicates the angle of incidence on the vertical scale o; and the action is substantially the same as that which takes place when electrical connections are used instead of mechanical devices, so that it is unnecessary to further explain the operation of the mechanical substitutes, since the foregoing explanation of the same in reference to the illumination of the groups of lamps applies with equal force to the graduated dials.

Referring to Fig. 19 it will be seen that I have represented therein a modified form of vane where instead of having a single device I use what is practically two vanes one of which 53$^a$ has a vertical surface and is acted upon by horizontal currents to actuate the tube 39 and cause a registration on the dial of the various angles of side-slip in the same manner as I have already explained, while at the bottom of the tube 39 there is another separate vane consisting of a horizontal faced vane 53$^b$ acted upon by the air along vertical lines so that communication may be made with the dial for the purpose of registering thereon the degree of the angles of incidence or attack. In some locations it will be found, therefore, quite desirable to use these separate vanes and their distinct use will contribute to efficiency and accuracy of operation.

From the foregoing description, therefore, it will be understood how my joint indicating mechanism for showing air speed, incidence and skid angles, may be operated for the purpose of enabling the pilot to skilfully guide his aeroplane through all kinds of perplexing and confusing air currents whether light or strong, for he is able to comprehend every moment precisely what his angle of incidence is and his angle of side-slip, and being advised constantly moreover regarding the speed of the aeroplane through the air he is able to avoid dangers and pitfalls and successfully operate the machine. The combination of the relative groups of signals or indicators on the same dial assists greatly in the ease and skill with which the aviator steers and manipulates his machine and it is seen that my improved dial can be used either with electrical or mechanical connections; further, it is evident that the pressure transmitter may be arranged in a great variety of ways; in fact, it will be seen that in the construction, operation, and application of the invention manifold changes may be made in the precise form and arrangement of the parts without exceeding the scope thereof, and I reserve the liberty of making all such changes as are required and permissible in the ensuing claims. Of course, it will be evident that the air speed meter may be employed separately from the angle of incidence and angle of side-slip indicators, and that some machines may be employed simply with an indicating means for the incidence angle and others with indicating means alone for the side-slip angle, either combined with or made without the air speed meter, while others may have all three devices jointly arranged in the convenient way I have described, and it will also be manifest that I can employ transmitting mechanism in combination with either visual or audible signals, the details of which may vary within wide limits, and there may be a great difference in the kinds of transmitters for transmitting the motion, wherefore I am able to employ and utilize the most practical form of connecting means, together with the most approved shape and relative arrangement of the parts provided the most practical and beneficial result is attained thereby.

Having thus described my invention, what I claim as new and desire to secure by Letters Patent, is:—

1. In a combined air speed meter and angle indicating device for aeroplanes and the like, the combination of an air pressure device, a vane, a dial having notations thereon showing different speeds and angles, electrical connections between the pressure device, the vane, and the dial, and means for automatically cutting out the current when the pressure device is at rest.

2. In a combined air speed meter and angle indicator for aeroplanes and the like, the combination of an air pressure device which moves when acted on by the air currents, a vane, a dial having notations thereon showing different speeds and angles, connections between the air pressure device and the dial whereby the movements of the air pressure device are transmitted to indicate air speeds, and a tension device for the air pressure device which is adjustable relatively to the wind pressure.

3. In a combined air speed and angle-indicating device for aeroplanes and the like, means acted upon by the air to indicate the speed of the plane, means acted upon by the air to indicate the angle of incidence and also the angle of side slip, all of said means being arranged in the same unitary combination, and a dial having notations thereon for showing the rate of speed and also the angle of incidence and the angle of side-slip.

4. In an indicating mechanism for aeroplanes and the like, the combination of a device which moves under exposure to air pressure, a series of signals for indicating different degrees of air pressure, electrical connections between said signals and the aforesaid vibrating device, a vane, signals for showing the angular movement of the aeroplane, and connections between said last mentioned signals and the vane.

5. In an indicating device for aeroplanes and the like, the combination of a wind-pressure-operated device, a series of signals, connections between said device and the signals whereby different degrees of speed are indicated, a vane, signals for showing the angular movement of the plane, and electrical connections between the vane and said latter signals.

6. In a combined air-speed meter and angle indicator for aeroplanes and the like, the combination of a device exposed to air currents, a dial having notations thereon, connections between said device and the dial whereby different speeds are indicated, a vane, notations also on the dial for showing the angular movement of the plane, and electrical connections between the vane and said last mentioned notations.

7. In a combined air-speed meter and angle indicator for aeroplanes and the like, the combination of an air-pressure device movable under the action of the air currents, a vane likewise movable under the action of the air currents, a dial having a group of visual signals for showing air speed and another group of visual signals for showing angular position, and means whereby the movements of the air-pressure device and the vane are communicated to said several signals.

8. In a combined air-speed meter and angle indicator for aeroplanes and the like, the combination of an air-pressure device, a series of electrical lamps arranged in circuits controlled by the air pressure device, a vane, and a series of electric lamps arranged in circuits controlled by said vane, the lamps of each set being related to each other so as to permit easy inspection in order that air speed and angular position may be jointly observed.

9. In a combined air speed meter and angle indicator for aeroplanes and the like, the combination of an air pressure device, a vane, a dial having a peripheral group of signals showing air speed and a diametrical group of signals showing angular position, the latter group intersecting the first mentioned group, and operative connections between said signals and the air pressure device and the vane.

10. In a combined air speed meter and angle indicator for aeroplanes and the like, the combination of an air pressure device, a vane, a dial having a peripheral group of signals indicating air speed, a second peripheral group of signals indicating the side-slip, and an intersecting rectilineal group of signals denoting angle of incidence, said several groups being arranged for easy inspection, and connections between said signals and the air pressure device and the vane.

11. In a combined air speed meter and angle indicator for aeroplanes and the like, means acted upon by the air to indicate the speed of the plane, means acted upon by the air to indicate the angle of incidence and also the angle of side-slip, a dial having a group of signals for indicating air speed, a second group of signals for indicating the angle of side-slip, and an intersecting rectilineal group of signals representing angle of incidence, and electrical connections between said signals and the aforesaid means that are acted upon by the air.

12. In a combined air speed meter and angle indicator for aeroplanes and the like, the combination of means acted upon by the air to indicate the speed of the plane, means acted upon by the air to indicate the angle of incidence and also the angle of side-slip, a group of signals consisting of a series of electric lamps for indicating the air speed, a second group of signals consisting of electric lamps for indicating the angle of side-slip, and an intersecting group of signals consisting of electric lamps and indicating the angle of incidence, the intersecting points of the third group being midway of the length of the other two groups, and electrical connections between the signals and the aforesaid means acted upon by the air.

13. In a combined air-speed meter and angle indicator for aeroplanes and the like, a group of signals consisting of a series of electric lamps for indicating air speed, a second group of signals consisting of electric lamps for indicating the angle of side-slip, and an intersecting group of signals consisting of electric lamps and indicating the angle of incidence, the intersecting points of the third group being midway of the length of the other two groups, in combination with an air-pressure device, a vane, and electrical connections between them and the aforesaid groups of signals.

14. In a combined air-speed meter and angle indicator for aeroplanes and the like, the combination of a pivoted arm carrying a surface exposed to air pressure, a casing in which said arm is mounted, a vane, a member supporting it and hung under said casing so as to be susceptible of lateral rotation, a group of signals indicating air speed, connections between the same and the pivoted arm, a group of signals indicating angle of incidence, and a group of signals indicating angle of side-slip, together with connections between the same and the vane.

15. In a combined air-speed meter for aeroplanes and the like, the combination of an arm carrying a surface exposed to air pressure, a casing in which said arm is pivotally mounted, means acting upon the said arm for providing resistance thereto in proportion to the action of the air upon the surface exposed to air pressure, a group of signals consisting of electric lamps, electrical conductors between said lamps and the aforesaid casing, and a commutator device operated by said pivoted arm for the purpose of opening and closing the circuits so as to operate whichever signal shows the air speed at the moment.

16. In a combined air-speed meter and angle indicator for aeroplanes and the like, the combination of a pivoted arm carrying a surface exposed to air pressure, a casing in which said arm is pivotally mounted, a vane, a tube supporting said vane so that the latter may have freedom to move horizontally and vertically, means for hanging the said vane-support within the aforesaid casing so as to permit the same to have lateral rotation, indicators for showing air speed, angle of incidence, and side-slip, and means for transmitting the motion of the pivoted arm and also of the vane to the said several signals.

17. In a combined air-speed meter for aeroplanes and the like, the combination with an arm having a surface exposed to the air pressure, means for pivotally mounting said arm, a casing in which the pivotal means is arranged, a group of springs acting in connection with the lower end of said arm for the purpose of providing resistance thereto in proportion to the action of the wind against the said arm, adjusting screws operable in connection with said springs, all substantially described.

18. In a combined air-speed meter and angle indicator for aeroplanes and the like, the combination with a wind pressure operated arm, means for pivotally mounting the same, a multiple tensioning device for providing a yielding resistance to the movement of the said arm in proportion to the degree of wind pressure acting against the same, an automatic electric switch for cutting out the current when the wind-pressure arm is idle, a series of air-speed visual signals, electric circuits including said signals and the aforesaid arm, and a commutator device operated by the arm for opening and closing the circuits.

19. In a combined air-speed meter and angle indicator for aeroplanes and the like, the combination of a casing, means for supporting the same on an aeroplane, a wind-pressure-operated arm pivoted within the casing, a vane supported movably from said casing, said vane being movable in both a horizontal and a vertical plane, a commutator operated by the wind-pressure operated arm within the casing, commutator devices likewise within the casing and operated by the action of the vane, air-speed indicators, incidence angle indicators, and side-slip indicators, and a plurality of electric circuits for each group of indicators all opened and closed by the action of the aforesaid pressure arm and vane.

20. In a combined air-speed meter and angle indicator for aeroplanes and the like, the combination with a casing, means for supporting the same, a device pivotally mounted in said casing and exposed to air pressure, indicators operated by said device for showing the speed in the air, a vane, means for supporting it from the casing, said latter means having a lateral rotative movement, a dial having thereon related groups of signals for showing air speed, incidence angle and side-slip angle, and electrical means connecting said signals with the aforesaid devices arranged in connection with the casing so that a unitary combination supported at a single point may be provided.

In testimony whereof I hereunto affix my signature.

OSCAR A. DANIELSON.